(12) United States Patent
Hamidpour

(10) Patent No.: US 7,676,377 B2
(45) Date of Patent: Mar. 9, 2010

(54) SYSTEM FOR ANALYZING TRANSPORTATION INFRASTRUCTURE AND MINIMIZING REPAIR COSTS

(76) Inventor: Rafie Hamidpour, 8014 W. 121st Ter., Overland Park, KS (US) 66213

( * ) Notice: Subject to any disclaimer, the term of this patent is extended or adjusted under 35 U.S.C. 154(b) by 1356 days.

(21) Appl. No.: 11/112,459

(22) Filed: Apr. 22, 2005

(65) Prior Publication Data

US 2006/0241917 A1    Oct. 26, 2006

(51) Int. Cl.
G06Q 10/00 (2006.01)
G06Q 30/00 (2006.01)
G06F 17/00 (2006.01)
G06Q 7/00 (2006.01)

(52) U.S. Cl. .................. 705/1.1; 705/400
(58) Field of Classification Search ............ None
See application file for complete search history.

(56) References Cited

U.S. PATENT DOCUMENTS

| | | | |
|---|---|---|---|
| 5,189,606 A | | 2/1993 | Burns et al. |
| 5,534,289 A | | 7/1996 | Bilder et al. |
| 5,617,342 A | | 4/1997 | Elazouni |
| 5,737,227 A | | 4/1998 | Greenfield et al. |
| 6,151,565 A | * | 11/2000 | Lobley et al. ............ 703/2 |
| 6,584,414 B1 | | 6/2003 | Green et al. |
| 6,615,648 B1 | | 9/2003 | Ferguson et al. |
| 2002/0072943 A1 | * | 6/2002 | Usami et al. ............ 705/7 |
| 2002/0154029 A1 | * | 10/2002 | Watters et al. ......... 340/870.07 |
| 2004/0153270 A1 | * | 8/2004 | Yamashita et al. ............ 702/81 |

OTHER PUBLICATIONS

Fraser, Michael et al, Elements of an Integrated Health Monitoring Framework, SPIE-Int. Soc. Opt. Eng, Proceedings of the SPIE-The International Society for Optical Engineering, vol. 5047 (2003), pp. 231-242.*

* cited by examiner

Primary Examiner—John W Hayes
Assistant Examiner—George Chen
(74) Attorney, Agent, or Firm—Lathrop & Gage LLP

(57) ABSTRACT

A system, method, and software product analyzes transportation infrastructure that includes roadways and bridges. Condition indicators are associated with each roadway and bridge, and costs involved with first repairing each bridge and roadway at different points in time considering the condition indicators are determined and compared. Costs involved with maintaining the bridges and roadways are determined and compared. Priority values are associated with each roadway and bridge. Predetermined condition parameters and secondary predetermined condition parameters associated with the priority values are compared to the condition indicators to determine if the roadways and bridges are in need of repair or in definite need of repair. Aggregate costs are determined and compared to current and projected budgets.

10 Claims, 14 Drawing Sheets

FIG. 6

| CONDITION INDICATORS |
|---|
| asphalt ride quality indicator, |
| asphalt alligator cracking indicator |
| asphalt bleeding indicator |
| asphalt block cracking indicator |
| asphalt bump/sag indicator |
| asphalt corrugation indicator |
| asphalt depression indicator |
| asphalt edge cracking indicator |
| asphalt joint reflection cracking indicator |
| asphalt lane/shoulder drop off indicator |
| asphalt longitudinal and transverse cracking indicator |
| asphalt patching and utility cut patching indicator |
| asphalt pothole indicator |
| asphalt railroad crossing indicator |
| asphalt rutting indicator |
| asphalt shoving indicator |
| asphalt slippage cracking indicator |
| asphalt swell indicator |
| asphalt weathering and raveling indicator |
| concrete buckling indicator |
| concrete divided slab indicator |
| concrete durability cracking indicator |
| concrete faulting indicator |
| concrete joint seal damage indicator |
| concrete lane/shoulder drop off indicator |
| concrete linear cracking indicator |
| concrete large patching indicator |
| concrete small patching indicator |
| concrete punchout indicator |
| concrete railroad crossing indicator |
| concrete scaling/crazing indicator |
| concrete corner spalling indicator |
| concrete joint spalling indicator |

FIG. 9

| CONDITION INDICATORS | CONDITION INDICATOR SEVERITY | PREDETERMINED CONDITION PARAMETERS | ALLOWABLE SEVERITY | COMPARED SEVERITY |
|---|---|---|---|---|
| asphalt ride quality indicator | L | asphalt ride quality indicator | L | OK |
| asphalt alligator cracking indicator | L | asphalt alligator cracking indicator | L | OK |
| asphalt bleeding indicator | L | asphalt bleeding indicator | L | OK |
| asphalt block cracking indicator | L | asphalt block cracking indicator | L | OK |
| asphalt bump/sag indicator | L | asphalt bump/sag indicator | L | OK |
| asphalt corrugation indicator | L | asphalt corrugation indicator | L | OK |
| asphalt depression indicator | L | asphalt depression indicator | L | OK |
| asphalt edge cracking indicator | L | asphalt edge cracking indicator | L | OK |
| asphalt joint reflection cracking indicator | L | asphalt joint reflection cracking indicator | L | OK |
| asphalt lane/shoulder drop off indicator | L | asphalt lane/shoulder drop off indicator | L | OK |
| asphalt longitudinal and transverse cracking indicator | L | asphalt longitudinal and transverse cracking indicator | L | OK |
| asphalt patching and utility cut patching indicator | L | asphalt patching and utility cut patching indicator | L | OK |
| asphalt pothole indicator | L | asphalt pothole indicator | L | OK |
| asphalt railroad crossing indicator | L | asphalt railroad crossing indicator | L | OK |
| asphalt rutting indicator | L | asphalt rutting indicator | L | OK |
| asphalt shoving indicator | L | asphalt shoving indicator | L | OK |
| asphalt slippage cracking indicator | L | asphalt slippage cracking indicator | L | OK |
| asphalt swell indicator | L | asphalt swell indicator | L | OK |
| asphalt weathering and raveling indicator | L | asphalt weathering and raveling indicator | L | OK |
| concrete buckling indicator | M | concrete buckling indicator | M | OK |
| concrete divided slab indicator | L | concrete divided slab indicator | M | OK |
| concrete durability cracking indicator | L | concrete durability cracking indicator | M | OK |
| concrete faulting indicator | L | concrete faulting indicator | M | OK |
| concrete joint seal damage indicator | L | concrete joint seal damage indicator | M | OK |
| concrete lane/shoulder drop off indicator | M | concrete lane/shoulder drop off indicator | L | NOT OK |
| concrete linear cracking indicator | L | concrete linear cracking indicator | M | OK |
| concrete large patching indicator | L | concrete large patching indicator | M | OK |
| concrete small patching indicator | M | concrete small patching indicator | M | OK |
| concrete punchout indicator | L | concrete punchout indicator | M | OK |
| concrete railroad crossing indicator | L | concrete railroad crossing indicator | M | OK |
| concrete scaling/crazing indicator | L | concrete scaling/crazing indicator | M | OK |
| concrete corner spalling indicator | L | concrete corner spalling indicator | M | OK |
| concrete joint spalling indicator | L | concrete joint spalling indicator | M | OK |

FIG. 11

| CONDITION INDICATORS | CONDITION INDICATOR SEVERITY | PREDETERMINED CONDITION PARAMETERS | ALLOWABLE SEVERITY | COMPARED SEVERITY | SECONDARY PREDETERMINED CONDITION PARAMETERS | ALLOWABLE SEVERITY | COMPARED SEVERITY |
|---|---|---|---|---|---|---|---|
| asphalt ride quality indicator | L | asphalt ride quality indicator | L | OK | asphalt ride quality indicator | L | OK |
| asphalt alligator cracking indicator | L | asphalt alligator cracking indicator | L | OK | asphalt alligator cracking indicator | L | OK |
| asphalt weathering and raveling indicator | L | asphalt weathering and raveling indicator | L | OK | | | |
| concrete buckling indicator | M | concrete buckling indicator | M | OK | asphalt weathering and raveling indicator | M | OK |
| concrete divided slab indicator | L | concrete divided slab indicator | M | OK | concrete buckling indicator | M | OK |
| concrete durability cracking indicator | L | concrete durability cracking indicator | M | OK | concrete divided slab indicator | M | OK |
| concrete faulting indicator | L | concrete faulting indicator | M | OK | concrete durability cracking indicator | M | OK |
| concrete joint seal damage indicator | L | concrete joint seal damage indicator | M | OK | concrete faulting indicator | M | OK |
| concrete lane/shoulder drop off indicator | M | concrete lane/shoulder drop off indicator | L | NOT OK | concrete joint seal damage indicator | M | OK |
| concrete linear cracking indicator | L | concrete linear cracking indicator | M | OK | concrete lane/shoulder drop off indicator | H | OK |
| concrete large patching indicator | L | concrete large patching indicator | M | OK | concrete linear cracking indicator | M | OK |
| concrete small patching indicator | M | concrete small patching indicator | M | OK | concrete large patching indicator | M | OK |
| concrete punchout indicator | L | concrete punchout indicator | M | OK | concrete small patching indicator | H | OK |
| concrete railroad crossing indicator | L | concrete railroad crossing indicator | M | OK | concrete punchout indicator | M | OK |
| concrete scaling/crazing indicator | L | concrete scaling/crazing indicator | M | OK | concrete railroad crossing indicator | M | OK |
| concrete corner spalling indicator | L | concrete corner spalling indicator | M | OK | concrete scaling/crazing indicator | M | OK |
| concrete joint spalling indicator | L | concrete joint spalling indicator | M | OK | concrete corner spalling indicator | M | OK |
| | | | | | concrete joint spalling indicator | M | OK |

US 7,676,377 B2

SYSTEM FOR ANALYZING TRANSPORTATION INFRASTRUCTURE AND MINIMIZING REPAIR COSTS

BACKGROUND OF THE INVENTION

This invention relates generally to a system for evaluating infrastructure and minimizing overall repair costs. In particular, the present invention relates to a system that uses enumerated criteria for determining infrastructure condition and predicts the costs associated with repairing and maintaining the infrastructure if various repair/maintenance plans were to be implemented. In addition, this system minimizes overall costs of repair and maintenance and maximizes overall infrastructure quality while considering budget constraints.

Roadway and street managers face the daunting task of maintaining a transportation infrastructure that includes approximately six hundred thousand bridges and nearly four million miles of public roads and streets in the United States alone. Moreover, budgets for infrastructure maintenance are facing widespread shortages. As a result, these managers have to become increasingly proactive in analyzing maintenance scenarios and determining corrective measures while considering the various economic impacts and recognizing probable future trends.

Various proposals for systems that analyze pavement maintenance costs are found in the art, such as in U.S. Pat. Nos. 5,189,606; 5,737,227; and 6,584,414. Writings may also be found that address the issue, such as *Pavement Management Guide November* 2001: *Executive Summary Report* (American Ass'n of State Highway and Transportation Officials 2001). While assumably effective for their intended purposes, these systems do not minimize overall costs of repair and maintenance or maximize overall infrastructure quality while considering budget constraints. Nor do they take into consideration the entire transportation infrastructure; instead they focus solely on pavement.

Moreover, the applicant's system uses enumerated criteria and observed data to provide a user with a range of information, including the lifetime cost of repairing a specific segment of infrastructure at any given time compared to the lifetime cost of repairing that segment of infrastructure at any other given time, the repairs needed to minimize overall costs to the entire infrastructure system over any given time frame while considering budget constraints, and various solutions to maximize infrastructure condition while considering budget constraints.

SUMMARY OF THE INVENTION

A system for analyzing transportation infrastructure and minimizing repair costs according to the present invention comprises steps for: associating a plurality of condition indicators with each bridge and roadway; determining costs involved with first repairing each bridge and roadway at two or more points in time considering the associated condition indicators; determining costs involved with maintaining each bridge and roadway over a time interval if the bridges and roadways are first repaired at two or more separate points in time; comparing the costs involved with first repairing each bridge and roadway at the different points in time; comparing the costs involved with maintaining each bridge and roadway over the time interval with the first repair occurring at the different points in time; determining when to repair the bridges and roadways to minimize costs involved with maintaining the bridges and roadways over the time interval; comparing various costs to current and future budgets; associating priority values having predetermined condition parameters and secondary predetermined condition parameters with each bridge and roadway; comparing the predetermined condition parameters and the secondary predetermined condition parameters to the condition indicators; and determining which bridges and roadways are in need of repair and which are in definite need of repair.

In a preferred embodiment, a software product has instructions, stored on computer-readable media, wherein the instructions, when executed by a computer, perform steps for analyzing transportation infrastructure, including: instructions for associating a respective plurality of condition indicators with each bridge and roadway; instructions for determining costs involved with first repairing each bridge and roadway at a first point in time considering the associated condition indicators; instructions for determining costs involved with maintaining each bridge and roadway over a time interval if the bridges and roadways are first repaired at the first point in time; instructions for determining costs involved with first repairing each bridge and roadway at a second point in time considering the associated condition indicators; instructions for determining costs involved with maintaining each bridge and roadway over the time interval if the bridges and roadways are first repaired at the second point in time; instructions for comparing the costs involved with first repairing each bridge and roadway at the first point in time to the costs involved with first repairing each bridge and roadway at the second point in time; instructions for comparing the costs involved with maintaining each bridge and roadway over the time interval if the bridges and roadways are first repaired at the first point in time to the costs involved with maintaining each bridge and roadway over the time interval if the bridges and roadways are first repaired at the second point in time; instructions for determining when to repair the bridges and roadways to minimize the costs involved with maintaining the bridges and roadways over the time interval; instructions for associating a respective priority value with each bridge and roadway, each priority value corresponding to a respective set of predetermined condition parameters; instructions for comparing the predetermined condition parameters associated with each bridge and roadway to the condition indicators associated with each bridge and roadway; instructions for determining that bridges and roadways having associated condition indicators beyond associated predetermined condition parameters are in need of repair; instructions for determining the aggregate cost of repairing all bridges and roadways in need of repair; instructions for comparing the aggregate cost of repairing all bridges and roadways in need of repair to a budget; instructions for associating a respective set of secondary predetermined condition parameters with each priority value; instructions for comparing the secondary predetermined condition parameters associated with each bridge and roadway to the condition indicators associated with each bridge and roadway; instructions for determining that bridges and roadways having associated condition indicators beyond associated secondary predetermined condition parameters are in definite need of repair; instructions for determining an aggregate cost of repairing all bridges and roadways in definite need of repair; and instructions for comparing the aggregate cost of repairing all bridges and roadways in definite need of repair to the budget.

BRIEF DESCRIPTION OF THE DRAWINGS

FIG. 6 is a chart of preferred condition indicators;

FIG. 9 is a chart demonstrating condition indicators being compared to predetermined condition parameters;

FIG. 11 is a chart demonstrating condition indicators being compared to predetermined condition parameters and secondary predetermined condition parameters;

DESCRIPTION OF THE PREFERRED EMBODIMENT

A system and method for analyzing transportation infrastructure and minimizing repair costs according to the present invention will now be described in detail with reference to FIGS. 1 through 14 of the accompanying drawings. The system is capable of analyzing the infrastructure costs and infrastructure condition and making comparisons based on chosen courses of action.

Figure 1:
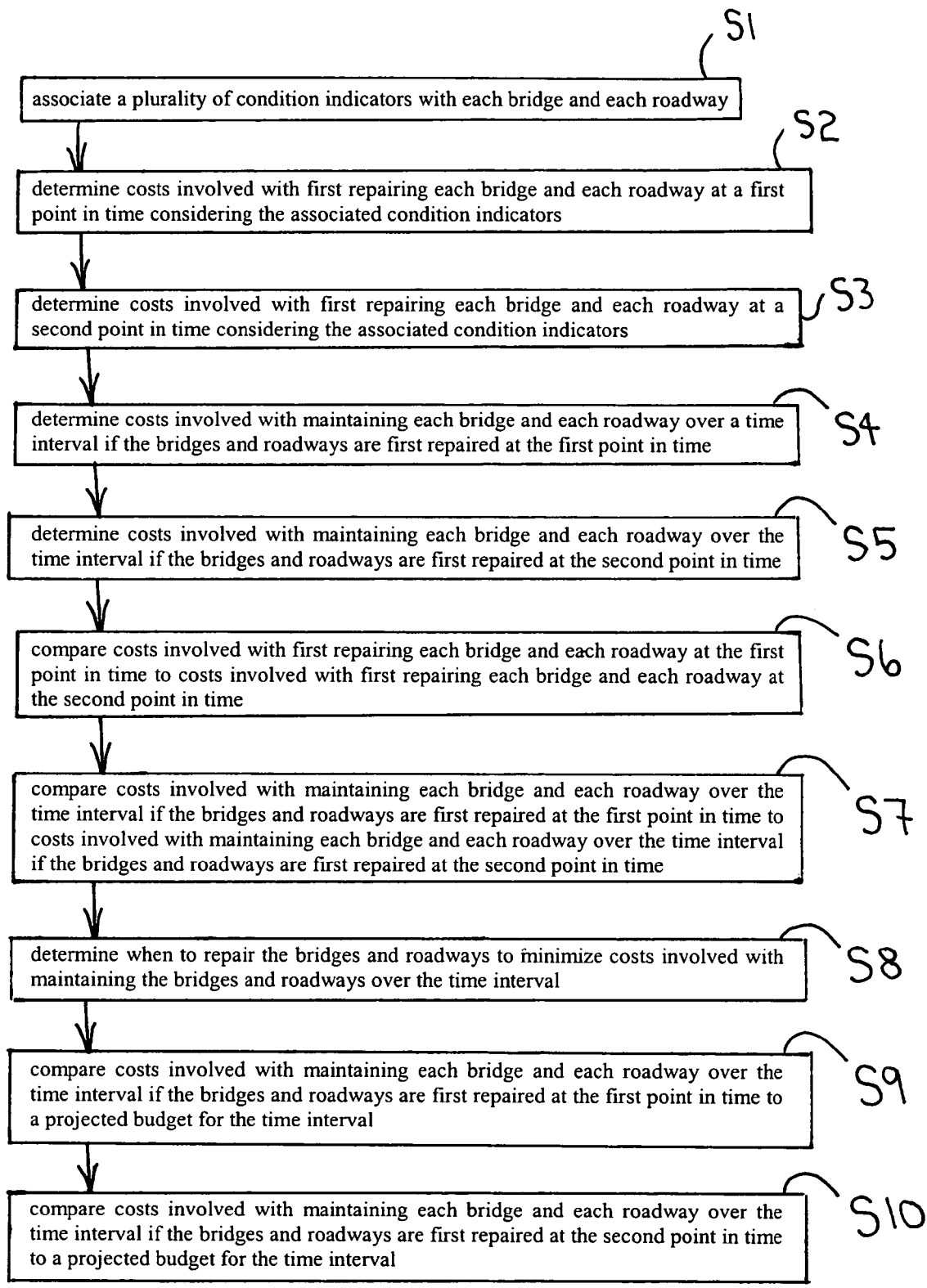
FIG. 1 is a flowchart that shows one exemplary process for determining and comparing costs associated with first repairing and maintaining roadways and bridges.
Figure 7:
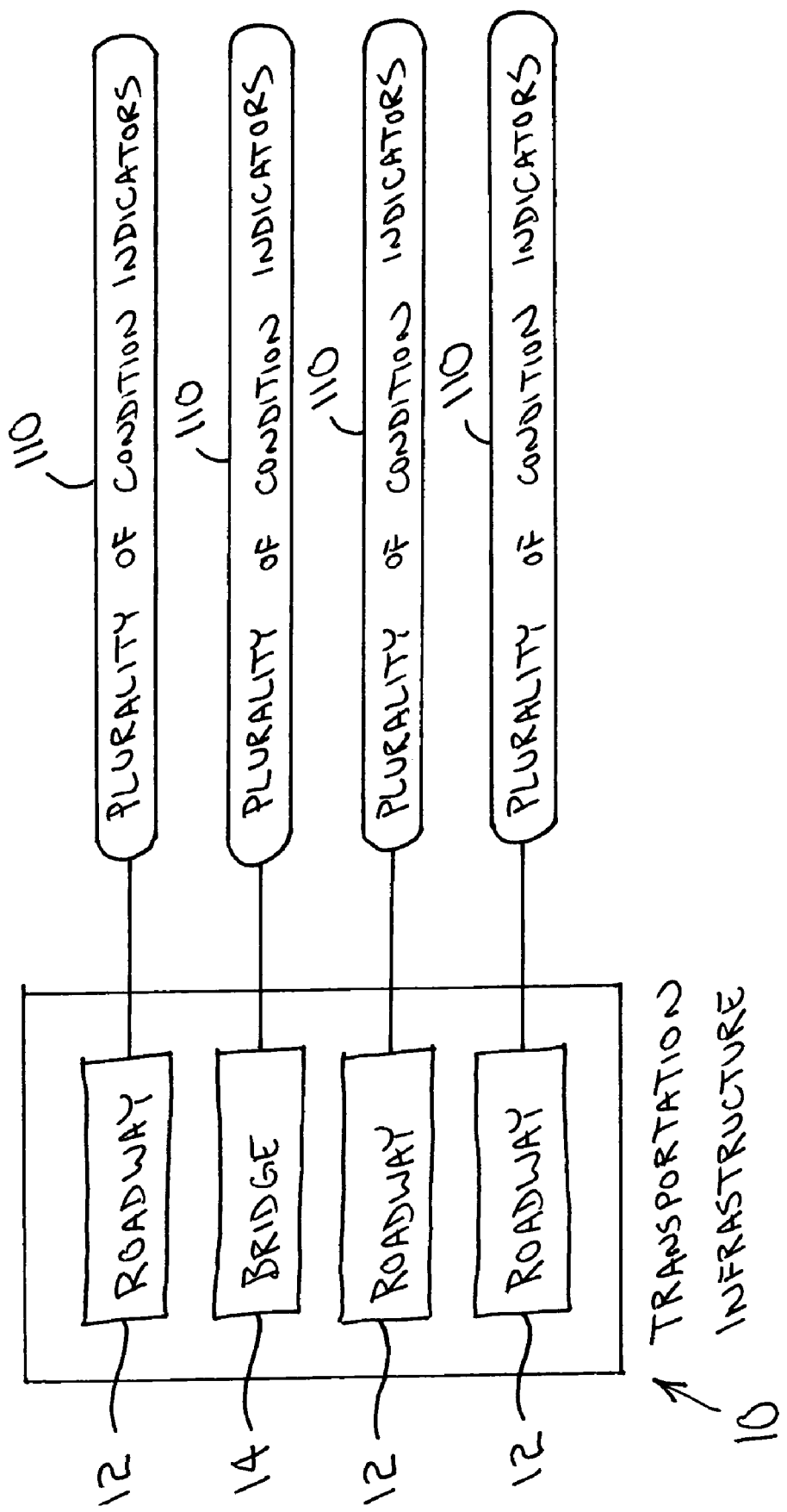
FIG. 7 is a diagram indicating associations between roadways, bridges, and condition indicators.

The first step of the current system involves assessing the present condition of the infrastructure 10. More particularly, at step S1 (FIG. 1) a plurality of condition indicators 110 are associated with each roadway 12 and each bridge 14 to represent its physical state (FIGS. 1 and 7). Though these condition indicators 110 may be assigned based on the age or history of the roadway 12 or bridge 14, it is preferred that at least some of the condition indicators 110 are observed condition indicators 110. In other words, at least some of the condition indicators 110 are preferably based on observational data. A table of preferred condition indicators 110 may be found in FIG. 6.

While not exclusive, the condition indicators 110 preferably comprise an asphalt ride quality indicator 110$a$, an asphalt alligator cracking indicator 110$b$, an asphalt bleeding indicator 110$c$, an asphalt block cracking indicator 110$d$, an asphalt bump/sag indicator 110$e$, an asphalt corrugation indicator 110$f$, an asphalt depression indicator 110$g$, an asphalt edge cracking indicator 110$h$, an asphalt joint reflection cracking indicator 110$i$, an asphalt lane/shoulder drop off indicator 110$j$, an asphalt longitudinal and transverse cracking indicator 110$k$, an asphalt patching and utility cut patching indicator 110$l$, an asphalt pothole indicator 110$m$, an asphalt railroad crossing indicator 110$n$, an asphalt rutting indicator 110$o$, an asphalt shoving indicator 110$p$, an asphalt slippage cracking indicator 110$q$, an asphalt swell indicator 110$r$, an asphalt weathering and raveling indicator 110$s$, a concrete buckling indicator 110$t$, a concrete divided slab indicator 110$u$, a concrete durability cracking indicator 110$v$, a concrete faulting indicator 110$w$, a concrete joint seal damage indicator 110$x$, a concrete lane/shoulder drop off indicator 110$y$, a concrete linear cracking indicator 110$z$, a concrete large patching indicator 110$aa$, a concrete small patching indicator 110$ab$, a concrete punchout indicator 110$ac$, a concrete railroad crossing indicator 110$ad$, a concrete scaling/crazing indicator 110$ae$, a concrete corner spalling indicator 110$af$, and a concrete joint spalling indicator 110$ag$. Asphalt condition indicators 110 (as discerned from the individual indicator names) apply only to asphalt surfaces, and concrete condition indicators 110 (as discerned from the individual indicator names) apply only to concrete surfaces. Condition indicator severity levels 112 of low, medium, and high are preferred and will be described in detail herein. It is also possible to use a numbering system or another system to mark and track severity levels for the condition indicators 110. For a concrete surface, all asphalt condition indicators 110 are set to low severity; for an asphalt surface, all concrete condition indicators 110 are set to low severity.

The asphalt ride quality indicator 110$a$ measures the ride quality considering bumps, corrugation, railroad crossings, shoving, and swells. Low severity indicates that vehicle vibrations may be noticeable, but no reduction in speed is necessary for comfort or safety, or that while individual bumps or settlements cause the vehicle to bounce slightly, there is little discomfort. Medium severity indicates that vehicle vibrations are significant and some reduction in speed is necessary for safety and comfort, or that individual bumps or settlements cause the vehicle to bounce significantly, creating some discomfort. High severity indicates that vehicle vibrations are so excessive that speed must be reduced considerably for safety and comfort, or that individual bumps or settlements cause the vehicle to bounce excessively, creating substantial discomfort, a safety hazard, or high potential vehicle damage. Ride quality is preferably determined by riding in a standard-size automobile over the road section at the posted speed limit. Road sections near stop signs should be rated at the normal deceleration speed used when approaching the sign.

The asphalt alligator cracking indicator 110$b$ measures series of interconnecting cracks caused by fatigue failure of the road surface under repeated traffic loading. Cracking begins at the bottom of the asphalt surface where tensile stress and strain are highest under a wheel load. The cracks propagate to the surface initially as a series of parallel longitudinal cracks. After repeated traffic loading, the cracks connect, forming many-sided, sharp-angled pieces that develop a pattern resembling chicken wire or the skin of an alligator. Low severity indicates the presence of fine, longitudinal hairline cracks running parallel to each other with none or only a few interconnecting cracks that are not spalled. Medium severity indicates further development of light alligator cracks into a pattern or network of cracks that may be lightly spalled. High severity indicates that network or pattern cracking has progressed so that the pieces are well defined and spalled at the edges. Some of the pieces may rock under traffic.

The asphalt bleeding indicator 110$c$ measures a film of bituminous material on the road surface which creates a shiny, glasslike reflection that usually becomes quite sticky and that is caused by excessive asphalt cement or tars in the mix, excess application of a bituminous sealant, or low air void content. Low severity indicates that bleeding has only occurred to a very slight degree and is noticeably only during a few days of the year and that asphalt does not stick to shoes or vehicles. Medium severity indicates that bleeding has only occurred to the extent that asphalt sticks to shoes and vehicles during only a few weeks of the year. High severity indicates that bleeding has occurred extensively and considerable asphalt sticks to shoes and vehicles during at least several weeks of the year.

The asphalt block cracking indicator $110d$ measures interconnected cracks that divide the pavement into approximately rectangular pieces that may range in size from approximately one square foot to ten feet by ten feet. Block cracking is caused mainly by shrinkage of the asphalt and daily temperature cycling and is not load-associated. Block cracking differs from alligator cracking in that alligator cracks form smaller, many-sided pieces with sharp angles and that alligator cracks are load-associated and therefore found only in wheel paths. Low severity indicates that blocks are defined by low severity cracks; medium severity indicates that blocks are defined by medium severity cracks; high severity indicates that blocks are defined by high severity cracks.

The asphalt bump/sag indicator $110e$ measures small, localized, upward or downward displacements of the road surface that may be caused by buckling or bulging of underlying Portland Cement Concrete (PCC) slabs in asphalt concrete (AC) overlay, frost heave, or infiltration and buildup of material in a crack in combination with traffic loading, among other things. Low severity indicates that the bumps/sags cause a slight reduction in ride quality. Medium severity indicates that the bumps/sags cause a medium reduction in ride quality. High severity indicates that the bumps/sags cause a high reduction in ride quality.

The asphalt corrugation indicator $110f$ measures series of closely spaced ridges and valleys occurring at fairly regular intervals (usually less than ten feet in length) and being perpendicular to the traffic direction. Corrugation is usually caused by traffic action combined with an unstable pavement surface or base, but if bumps occur in a series less than ten feet in length, due to any cause, the distress is considered corrugation. Low severity indicates that the corrugation causes a slight reduction in ride quality. Medium severity indicates that the corrugation causes a medium reduction in ride quality. High severity indicates that the corrugation causes a high reduction in ride quality.

The asphalt depression indicator $110g$ measures localized pavement surface areas with elevations slightly lower than those of the surrounding surface. Depressions are created by settlement of the foundation soil or are a result of improper construction and can cause some roughness or hydroplaning. Low severity indicates ½ inch to 1 inch depressions. Medium severity indicates 1 inch to 2 inch depressions. High severity indicates depressions over 2 inches.

The asphalt edge cracking indicator $110h$ measures cracks that are parallel to and usually within one to two feet of the outer edge of the pavement. Edge cracks are accelerated by traffic loading and can be caused by frost-weakened base or subgrade near the edge of the pavement. Low severity indicates low or medium cracking with no breakup or removal of pieces. Medium severity indicates medium cracks with some breakup and possibly removal of pieces. High severity indicates considerable breakup along the edge and possibly removal of pieces.

The asphalt joint reflection cracking indicator $110i$ measures cracks caused by the thermal or moisture-induced movement of a Portland Cement Concrete (PCC) slab beneath an asphalt concrete (AC) surface. These cracks are not load-related, but traffic loading may cause a breakdown of the AC surface near the cracks. Low severity indicates the presence of non-filled cracks less than ⅜ inch wide or filled cracks of any width. Medium severity indicates the presence of non-filled cracks between ⅜ inch and 3 inches wide, the presence of non-filled cracks of any width up to 3 inches surrounded by light random cracking, or filled cracks of any width surrounded by light random cracking. High severity indicates the presence of any crack filled or non-filled surrounded by medium or high severity random cracking, non-filled cracks over 3 inches, or a crack of any width where a few inches of pavement around a crack is severely broken.

The asphalt lane/shoulder drop off indicator $110j$ measures the difference in elevation between the pavement edge and the shoulder. Lane/shoulder drop off is caused by shoulder erosion, shoulder settlement, or by building up the roadway without adjusting the shoulder level. Low severity indicates that the difference in elevation between the pavement edge and shoulder is 1 to 2 inches. Medium severity indicates that the difference in elevation is between 2 and 4 inches. High severity indicates that the difference in elevation is greater than 4 inches.

The asphalt longitudinal and transverse cracking indicator $110k$ measures cracks parallel to the pavement's centerline or laydown direction and cracks that extend across the pavement at approximately right angles to the pavement centerline or direction of laydown. Longitudinal and transverse cracks may be caused by a poorly constructed paving lane joint; shrinkage of the AC surface due to low temperatures, hardening of the asphalt, or daily temperature cycling; or a reflective crack caused by cracking beneath the surface course, including cracks in PCC slabs. Low severity indicates the presence of non-filled cracks less than ⅜ inch wide or filled cracks of any width. Medium severity indicates the presence of non-filled cracks between ⅜ inch and 3 inches wide, non-filled cracks of any width up to 3 inches surrounded by light and random cracking, or filled cracks of any width surrounded by light random cracking. High severity indicates the presence of any crack filled or non-filled surrounded by medium or high severity random cracking, non-filled cracks over 3 inches, or a crack of any width where a few inches of pavement around a crack is severely broken.

The asphalt patching and utility cut patching indicator $110l$ measures areas of pavement which have been replaced with material to repair the existing pavement. Low severity indicates that the patch is in good condition and satisfactory and that there is slight or no reduction in ride quality. Medium severity indicates that the patch is moderately deteriorated or that there is a medium reduction in ride quality. High severity indicates that the patch is badly deteriorated or that there is a high reduction in ride quality.

The asphalt pothole indicator $110m$ measures small (usually less than three feet in diameter,) bowl-shaped depressions in the pavement surface generally having sharp edges and vertical sides near the top of the hole. Low severity indicates: an average diameter up to 8 inches and a maximum depth of 2 inches; or an average diameter between 8 inches and 18 inches and a maximum depth of 1 inch. Medium severity indicates: an average diameter up to 8 inches and a maximum depth greater than 2 inches; an average diameter between 8 inches and 18 inches and a maximum depth between 1 inch and 2 inches; or an average diameter between 18 inches and 30 inches and a maximum depth of 1 inch. High severity indicates an average diameter between 18 inches and 30 inches and a maximum depth greater than 1 inch.

The asphalt railroad crossing indicator $110n$ measures depressions or bumps around or between railroad tracks. Low severity indicates that the depressions/bumps cause a slight reduction in ride quality. Medium severity indicates that the depressions/bumps cause a medium reduction in ride quality. High severity indicates that the depressions/bumps cause a high reduction in ride quality.

The asphalt rutting indicator $110o$ measures surface depressions in wheel paths. Low severity indicates that the mean rut depth is less than ½ inch. Medium severity indicates that the mean rut depth is between ½ inch and 1 inch. High severity indicates that the mean rut depth is greater than 1 inch.

The asphalt shoving indicator $110p$ measures permanent longitudinal displacements of localized areas of pavement surface caused by traffic loading. Low severity indicates that the shoving causes a slight reduction in ride quality. Medium severity indicates that the shoving causes a medium reduction in ride quality. High severity indicates that the shoving causes a high reduction in ride quality.

The asphalt slippage cracking indicator $110q$ measures crescent or half-moon shaped cracks having two ends pointing away from the direction of traffic. These cracks are produced when breaking or turning wheels cause the pavement surface to slide or deform and usually occur when there is a low-strength surface mix or a poor bond between the surface and the next layer of the pavement structure. Low severity indicates that the average crack width is less than ⅜ inch. Medium severity indicates that the average crack width is between ⅜ inch and 1½ inch or that the area around the crack is broken into tight-fitting pieces. High severity indicates that the average crack width is greater than 1½ inch or that the area around the crack is broken into easily removed pieces.

The asphalt swell indicator $110r$ measures upward bulges in the pavement's surface that are long, gradual waves of more than 110 feet long. Swelling may be accompanied by surface cracking and is usually caused by frost action in the subgrade or by swelling soil. Low severity indicates that the swelling causes a slight reduction in ride quality. Medium severity indicates that the swelling causes a medium reduction in ride quality. High severity indicates that the swelling causes a high reduction in ride quality.

The asphalt weathering and raveling indicator $110s$ measures the wearing away of the pavement surface caused by the loss of asphalt or tar binder and dislodged aggregate particles. These distresses often indicate that either the asphalt binder has hardened appreciably or that a poor quality mixture is present. Low severity indicates that the aggregate or binder has started to wear away, and that in some areas the surface is starting to pit. In the case of oil spillage, the oil stain can be seen, but the surface is hard and cannot be penetrated with a coin. Medium severity indicates that the aggregate or binder has worn away and the surface texture is moderately rough and pitted. In case of oil spillage, the surface is soft and can be penetrated with a coin. High severity indicates that the aggregate or binder has been considerably worn away and the surface is very rough and severely pitted. The pitted areas are less than 4 inches in diameter and less than ½ inch deep; pitted areas larger than this are considered potholes. In case of oil spillage, the asphalt binder has lost its binding effect and the aggregate has become loose.

The concrete buckling indicator $110t$ measures buckles that occur in hot weather, usually in transverse cracks or joints that are not wide enough to permit slab expansion. Low severity indicates that the buckling causes a slight reduction in ride quality. Medium severity indicates that the buckling causes a medium reduction in ride quality. High severity indicates that the buckling causes a high reduction in ride quality.

The concrete divided slab indicator $110u$ signifies whether a slab is divided by cracks into four or more pieces due to overloading or inadequate support. Low severity indicates that a slab is broken into 4 to 8 pieces and that the cracks are not severe. Medium severity indicates that a slab is broken into more than 8 pieces and that the cracks are not severe; that the slab is broken into 4 to 8 pieces and that the cracks are of medium severity; or that a slab is broken into 4 to 5 pieces and that the cracks are of high severity. High severity indicates that a slab is broken into more than 8 pieces and that the cracks are of medium severity or that a slab is broken into 6 or more pieces and that the cracks are of high severity.

The concrete durability cracking indicator $110v$ measures a pattern of cracks running parallel and close to joint linear cracks. These cracks are caused by freeze-thaw expansion of the large aggregate which over time gradually breaks down the concrete and may eventually lead to disintegration of the entire slab. Low severity indicates that there are durability cracks over less than 15 percent of the area and that most of the cracks are tight, though a few pieces may have popped out. Medium severity indicates that durability cracks cover less than 15 percent of the area and that most of the pieces have popped out or can be easily removed, or that durability cracks cover more than 15 percent of the area and that most of the cracks are tight, though a few pieces may have popped out or can be easily removed. High severity indicates that durability cracks cover more than 15 percent of the area and that most of the pieces have popped out or can be easily removed.

The concrete faulting indicator $110w$ measures the difference in elevation across a joint. Faulting may be caused by settlement because of soft foundation, pumping or eroding of material from under the slab, or curling of the slab edges due to temperature and moisture changes. Low severity indicates a difference in elevation of up to ⅜ inch. Medium severity indicates a difference in elevation of ⅜ inch to ¾ inch. High severity indicates a difference in elevation of greater than ¾ inch.

The concrete joint seal damage indicator $110x$ measures soil or rocks that accumulate in the joints or joints that have significant water infiltration. Low severity indicates that the joint sealant is in generally good condition throughout the section and that the sealant is performing well, with only minor damage. Medium severity indicates that the joint sealant is in generally fair condition over the entire section, but that some joint damage has occurred to a moderate degree. High severity indicates that the joint sealant is in generally poor condition over the entire section, with joint damage having occurred to a severe degree.

The concrete lane/shoulder drop off indicator $110y$ measures the difference between the settlement or erosion of the shoulder and the pavement travel-lane edge. Low severity indicates that the difference between the pavement edge and the shoulder is less than 2 inches. Medium severity indicates that the difference in elevation is between 2 and 4 inches. High severity indicates that the difference in elevation is greater than 4 inches.

The concrete linear cracking indicator $110z$ measures cracks that divide a slab into two or three pieces, usually caused by a combination of repeated traffic loading, thermal gradient curling, and repeated moisture loading. For non-reinforced slabs, low severity indicates non-filled cracks having a width less than or equal to ½ inch or filled cracks of any width having the filler in satisfactory condition. For reinforced slabs, low severity indicates non-filled cracks having a width of ⅛ inch to 1 inch or filled cracks of any width having the filler in satisfactory condition. For non-reinforced slabs, medium severity indicates non-filled cracks having a width between ½ inch and 2 inches or filled cracks of any width with faulting less than ⅜ inch. For reinforced slabs, medium severity indicates non-filled cracks having a width less than or equal to 3 inches with up to ⅜ inch of faulting or filled cracks of any width with up to ⅜ inch of faulting. For non-reinforced slabs, high severity indicates non-filled cracks having a width greater than 2 inches or any crack (filled or non-filled) of any width having faulting greater than ⅜ inch. For reinforced slabs, high severity indicates non-filled cracks having a width greater than 3 inches or any crack (filled or non-filled) of any width having faulting greater than ⅜ inch.

The concrete large patching indicator 110aa measures areas of pavement over 5 square feet which have been replaced with filler material. Low severity indicates that the patch is functioning well and has little or no deterioration. Medium severity indicates that the patch is moderately deteriorated or that moderate spalling can be seen around the edges and the patch material can be dislodged with considerable effort. High severity indicates that the patch is badly deteriorated.

The concrete small patching indicator 110ab measures areas of pavement less than 5 square feet which have been replaced with filler material. Low severity indicates that the patch is functioning well and has little or no deterioration. Medium severity indicates that the patch is moderately deteriorated or that the patch material can be dislodged with considerable effort. High severity indicates that the patch is badly deteriorated.

The concrete punchout indicator 110ac measures localized areas of slabs that are broken into pieces. Punchouts usually are defined by a crack and a joint or two closely spaced cracks and are caused by heavy repeated loads, inadequate slab thickness, loss of foundation support, or a localized concrete construction deficiency such as honeycombing. Low severity indicates insevere cracks with 2 to 5 pieces or somewhat severe cracks with 2 to 3 pieces. Medium severity indicates somewhat severe cracks with 4 to 5 pieces or very severe cracks with 2 to 3 pieces. High severity indicates somewhat severe cracks with more than 5 pieces or very severe cracks with more than 3 pieces.

The concrete railroad crossing indicator 110ad measures depressions or bumps around or between railroad tracks. Low severity indicates that the depressions/bumps cause a slight reduction in ride quality. Medium severity indicates that the depressions/bumps cause a medium reduction in ride quality. High severity indicates that the depressions/bumps cause a high reduction in ride quality.

The concrete scaling/crazing indicator 110ae measures a network of shallow, fine, or hairline cracks which extend only through the upper surface of the concrete and tend to intersect at 120 degree angles. These cracks are usually caused by concrete over-fishing and may lead to surface scaling, which is the breakdown of the slab surface to a depth of ¼ to ½ inch. Low severity indicates that crazing exists over most of the slab area and that the surface is in good condition with only minor scaling present. Medium severity indicates that the slab is scaled, but less than 15 percent of the slab area is affected. High severity indicates that the slab is scaled over more than 15 percent of its area.

The concrete corner spalling indicator 110af measures the breakdown of a slab within approximately 2 feet of a corner. Low severity indicates that the spall is less than 1 inch deep and that the spall has an area of at least 5 inches by 5 inches or that the spall is between 1 and 2 inches deep and that the spall has an area of between 5 inches by 5 inches and 12 inches by 12 inches. Medium severity indicates that the spall is between 1 and 2 inches deep and that the spall has an area of at least 12 inches by 12 inches or that the spall is greater than 2 inches deep and that the spall has an area of between 5 inches by 5 inches and 12 inches by 12 inches. High severity indicates that the spall is greater than 2 inches deep and that the spall has an area of at least 12 inches by 12 inches.

The concrete joint spalling indicator 110ag measures the breakdown of a slab edge within 2 feet of a joint. Joint spalls usually do not extend vertically through a slab, but instead intersect the joint at an angle. These spalls result from excessive stresses at the joint caused by traffic loading or by infiltration of incompressible materials, weak concrete at the joint caused by overworking, or water accumulation in the joint and freeze-thaw action. Low severity indicates spalls of any length and any width as long as the pieces are tight and cannot be easily removed, or spalls less than 2 feet long and less than 4 inches wide regardless of the condition of the spall pieces. Medium severity indicates spalls less than 2 feet long and greater than 4 inches wide if most or all of the pieces have been removed, or spalls greater than 2 feet long and less than 4 inches wide if the pieces can be removed and some or all of the pieces are missing. High severity indicates spalls greater than 2 feet long and greater than 4 inches wide if most or all of the pieces have been removed.

Figure 2:
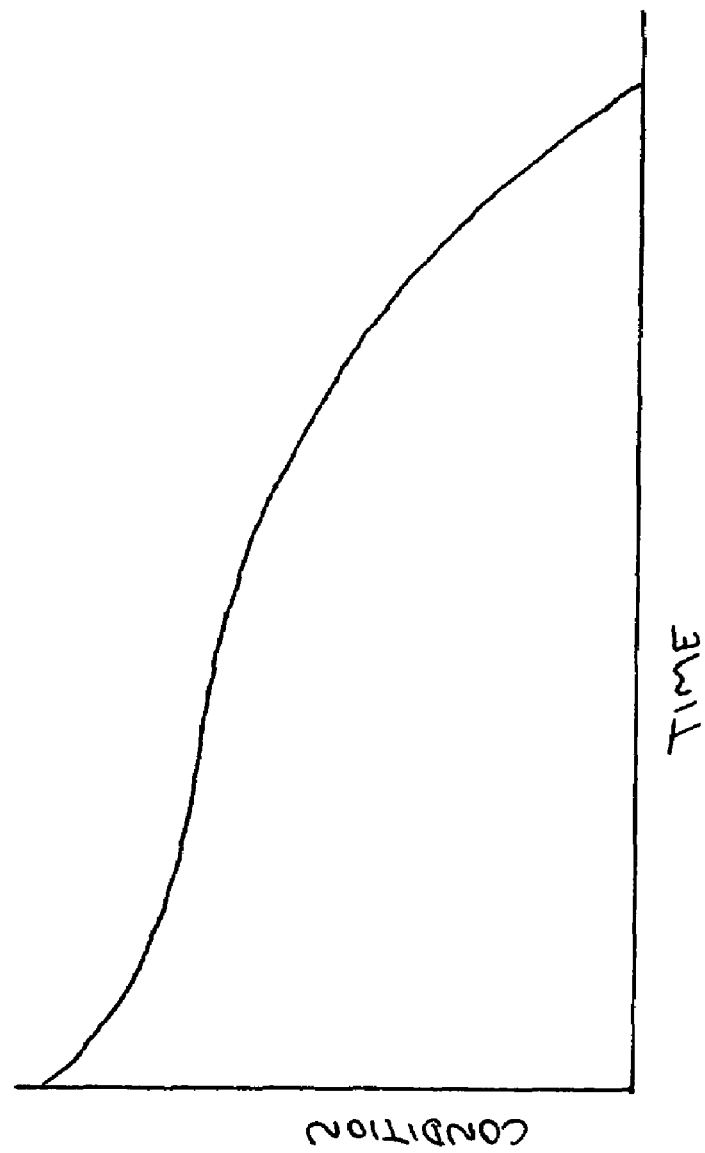
FIG. 2 is a graph that demonstrates infrastructure condition over time.
Figure 3:
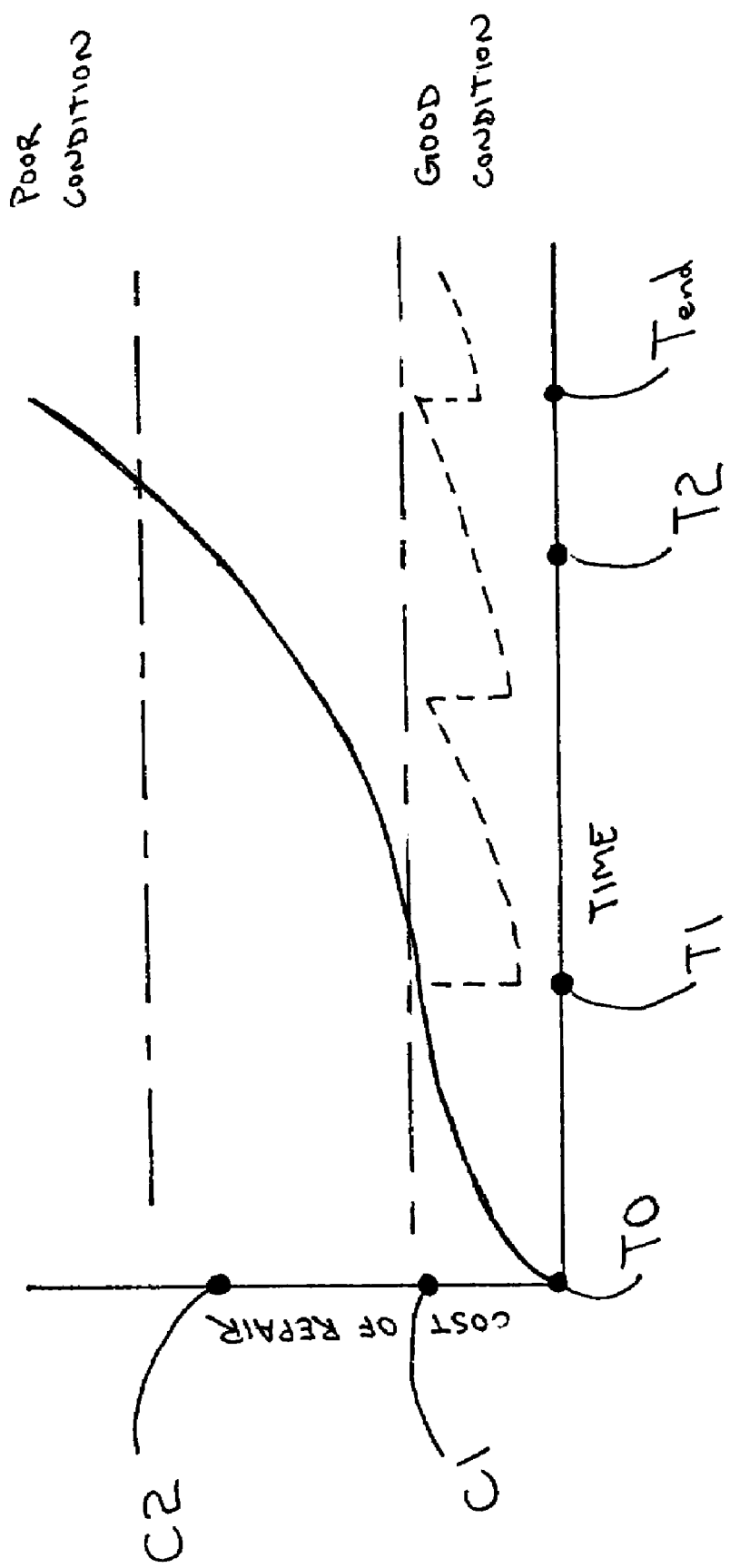
FIG. 3 is a graph that demonstrates cost of infrastructure repair over time using a solid line to indicate that no action is taken and a dotted line to indicate possible undertaken maintenance.
Figure 4:
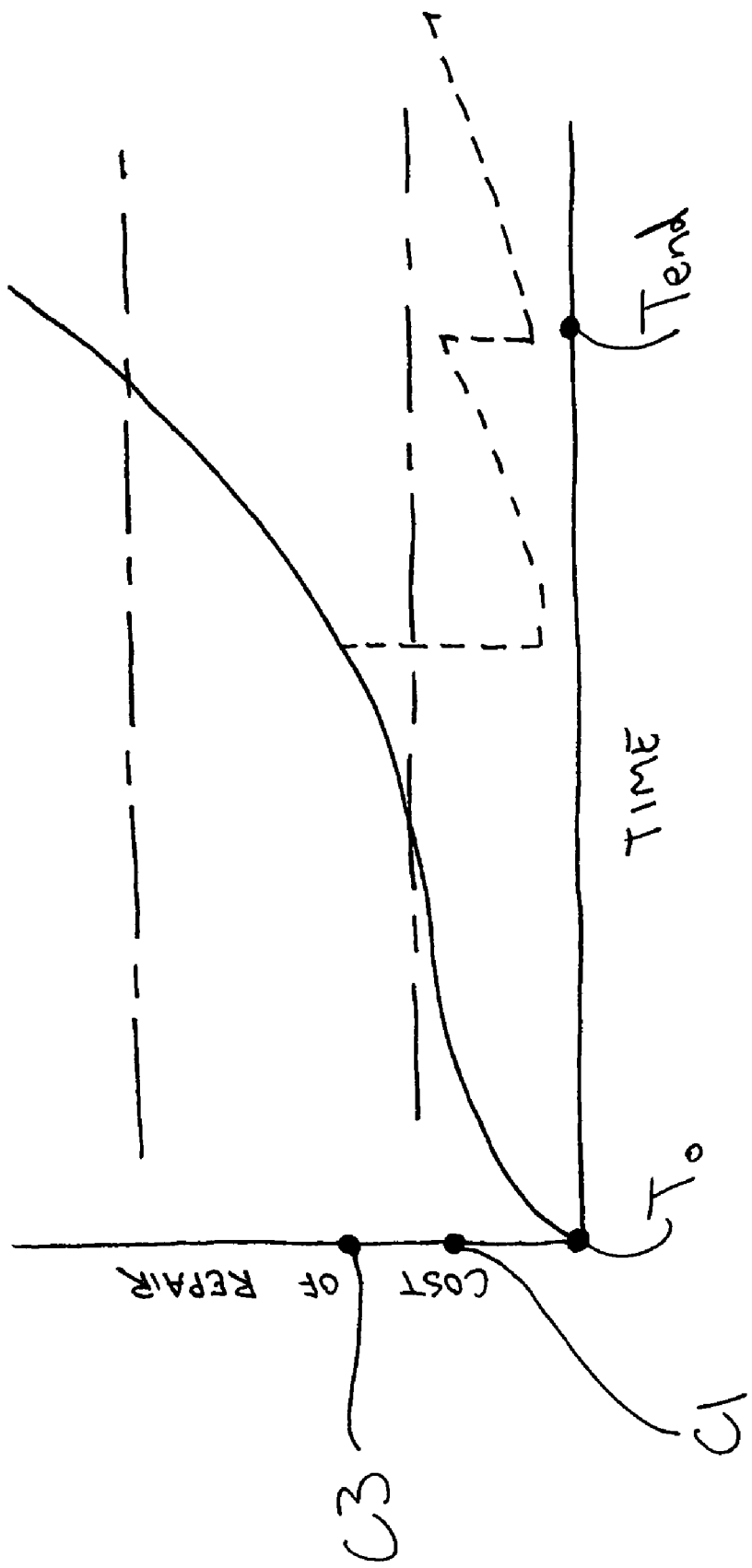
FIG. 4 is a graph that demonstrates cost of infrastructure repair over time using a solid line to indicate that no action is taken and a dotted line to indicate possible undertaken maintenance.
Figure 5:
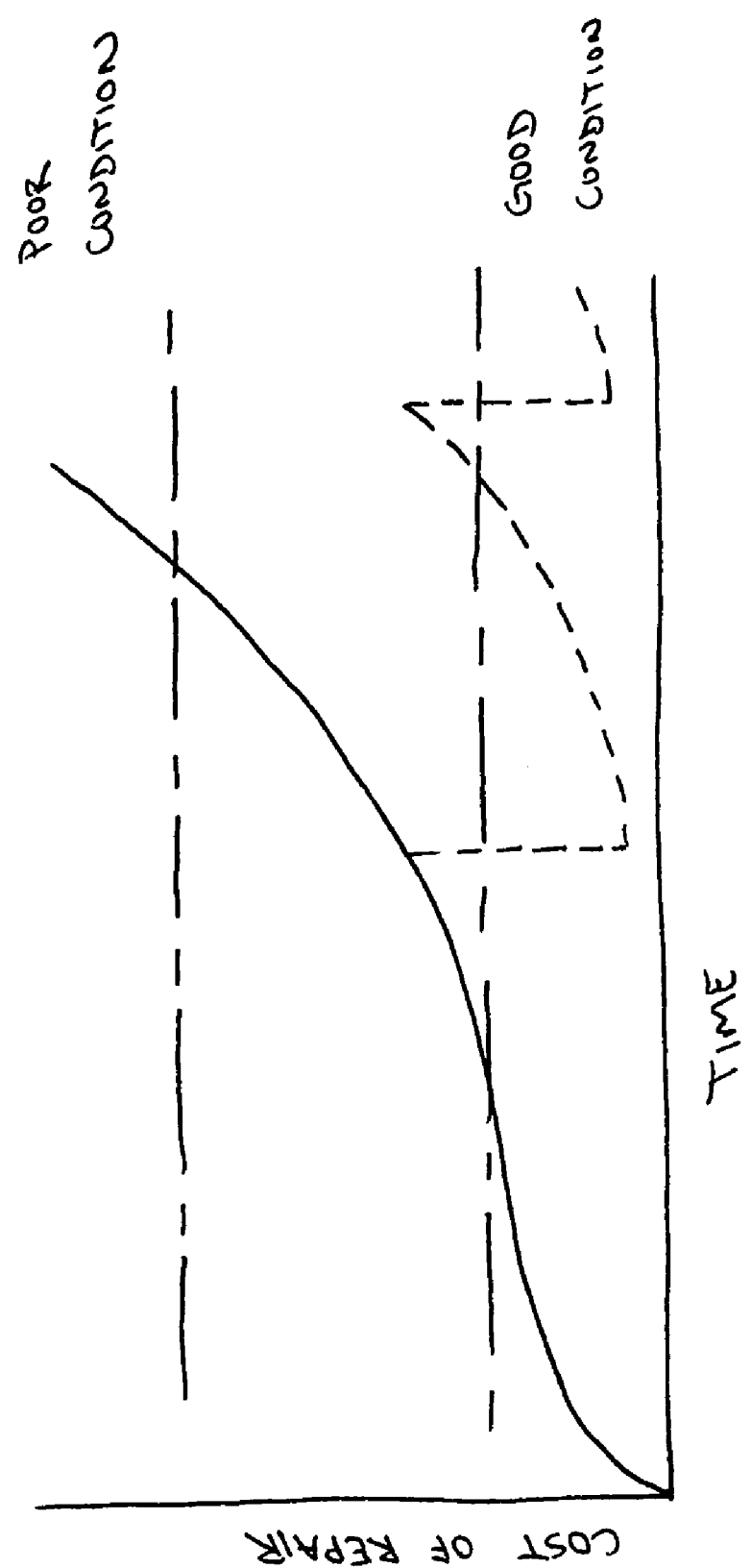
FIG. 5 is a graph that demonstrates cost of infrastructure repair over time using a solid line to indicate that no action is taken and a dotted line to indicate possible undertaken maintenance.

After the condition indicators 110 are associated with each bridge 14 and roadway 12, the respective costs involved with first repairing each respective bridge 14 and each respective roadway 12 at a first point in time may be determined at step S2 (FIG. 1). This is because the condition of respective roadways 12 and bridges 14 over time may be plotted out as shown in FIG. 2 using the condition indicators 110, and the respective cost of repair of roadways 12 and bridges 14 over time may be plotted out as shown in FIGS. 3 through 5 using the condition indicators 110. Using this same information and the same graphs, the respective costs involved with first repairing each respective bridge 14 and each respective roadway 12 at a second point time may be determined at step S3 (FIG. 1) by choosing another point on the line. For illustration, the cost involved with first repairing the structure depicted in FIG. 3 at first point in time T1 is labeled C1, and the cost involved with first repairing the structure depicted in FIG. 3 at another point in time T2 is labeled C2. At step S4 (FIG. 1), the respective costs C1 may then be compared to the respective costs C2 by subtracting C1 from C2.

In FIGS. 3 through 5, a dashed line represents a road 12 or bridge 14 that is periodically repaired and a solid line represents the same structure if no repair is undertaken. In FIG. 4, the dashed line represents a structure repaired at a later point on the cost/time curve than the structure represented by the dashed line in FIG. 3, resulting in a higher cost involved with the first repair. In FIG. 5, the dashed line represents a structure first repaired at approximately the same point on the cost/time curve as the structure represented by the dashed line in FIG. 4, but the structure represented by the dashed line in FIG. 5 was subsequently repaired at a later point on the cost/time curve than the structure represent by the dashed line in FIG. 4. This results in a higher cost for subsequent repair for the structure in FIG. 5 than the structure in FIG. 4.

The respective costs involved with maintaining each respective bridge 14 and each respective roadway 12 over a time interval T0 to Tend if the bridges 14 and roadways 12 are first repaired at a first point in time or if the bridges 14 and roadways 12 are first repaired at a second point in time may again be determined from the plots created from the condition indicators 110 at steps S5 and S6 (FIG. 1). For FIG. 3, for example, these costs are 3×C1. For FIG. 4, for example, these costs are C3+C1. Notably, the structure depicted in FIG. 3 and FIG. 4 is maintained in good condition after the initial repair in both figures. If this is deemed unnecessary, a repair schedule such as that represented in FIG. 5 (structure is not maintained in good condition) may be used. It is very important to note that the "cost of repair" axis on FIGS. 3 through 5 is not necessarily linear. C1 may be $1/unit area, C2 may be $9/unit area, and C3 may be $3/unit area, for example.

The respective costs involved with maintaining each roadway 12 and each bridge 14 over a time interval if the roadways 12 and bridges 14 are first repaired at different points in time may then be compared at step S7 (FIG. 1) by subtracting one cost from the other. The difference in cost for maintaining the structure depicted in FIGS. 3 and 4 would therefore be: C3+C1−(3×C1). Based on this information and trying different times for initial repair and different maintenance levels, the costs involved with maintaining the respective roadways 12 and bridges 14 over a time interval may be minimized at step S8 (FIG. 1).

If there are future budget concerns, the respective costs involved with maintaining each roadway 12 and each bridge 14 over a time interval if the roadways 12 and bridges 14 are first repaired at different points in time may then be compared to a future or projected budget at steps S9 and S10 (FIG. 1) by subtracting the costs involved from the future or projected budget.

Figure 8:
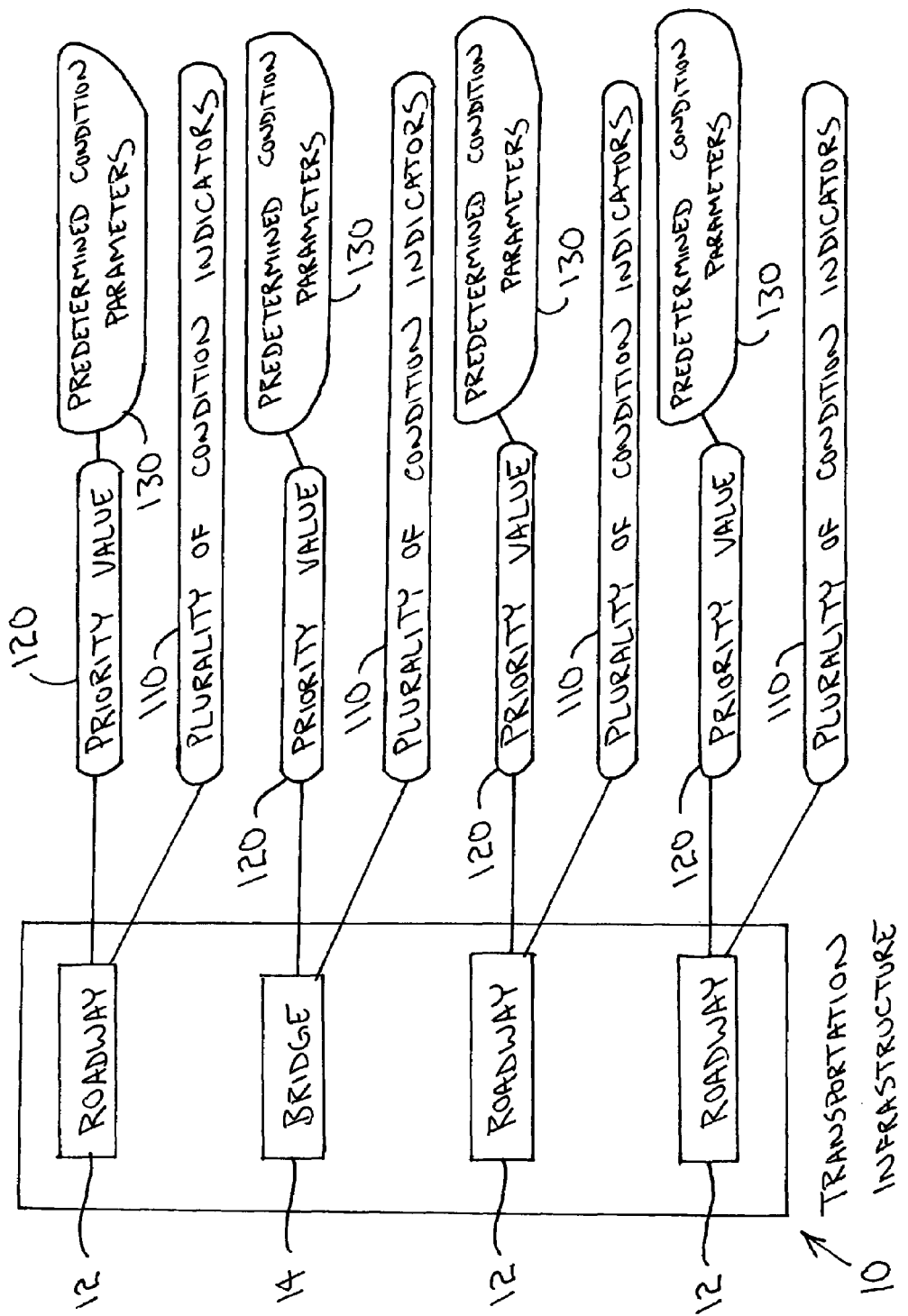
FIG. 8 is a diagram indicating associations between roadways, bridges, condition indicators, priority values, and predetermined condition parameters.

A priority value 120 is associated with each respective roadway 12 and each respective bridge 14 at step S11 (FIG. 10), and each priority value 120 corresponds to a respective set of predetermined condition parameters 130 (FIG. 8). The predetermined condition parameters 130 correspond to the condition indicators 110 and include acceptable levels of severity 130a to compare to the condition indicators 110.

Figure 10:
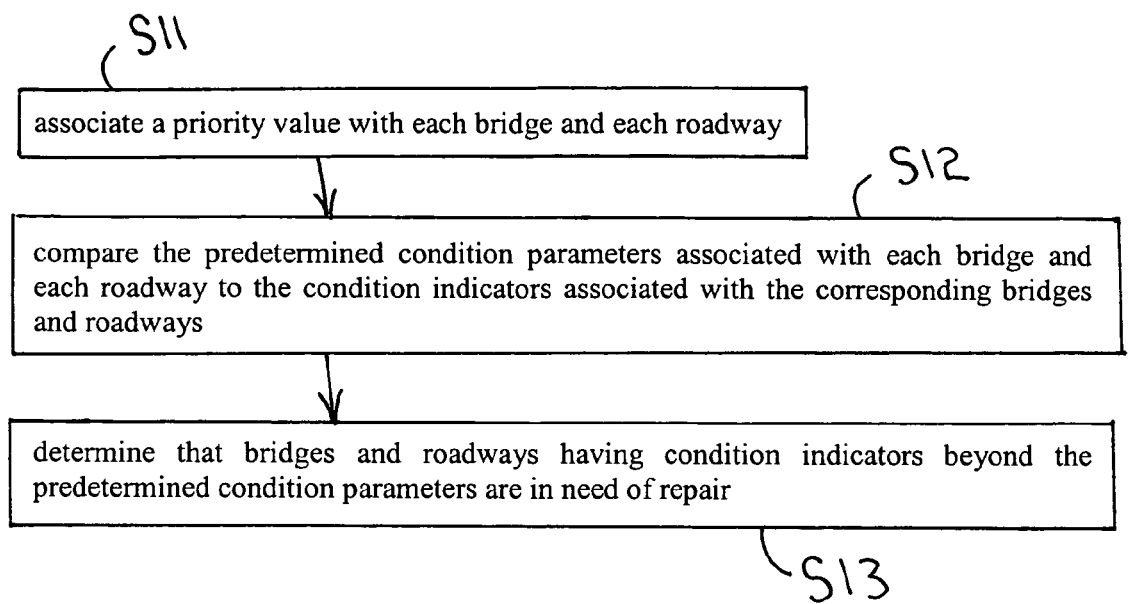
FIG. 10 is a flowchart that shows one exemplary process for determining which roadways and bridges are in need of repair.

At step S12 (FIG. 10), the predetermined condition parameters 130 associated with each respective bridge 14 and roadway 12 are compared to the condition indicators 110 associated with the corresponding bridge 14 or roadway 12. This comparison can be seen in FIG. 9 at 132. Respective bridges 14 and roadways 12 having condition indicators 110 beyond the associated predetermined condition parameters 130 should then be determined to be in need of repair at step S13 (FIG. 10). In the example of FIG. 9, the concrete lane/shoulder drop off indicator of "medium" is beyond the acceptable level of "low", so the structure corresponding to FIG. 9 should be determined to be in need of repair.

Figure 12:
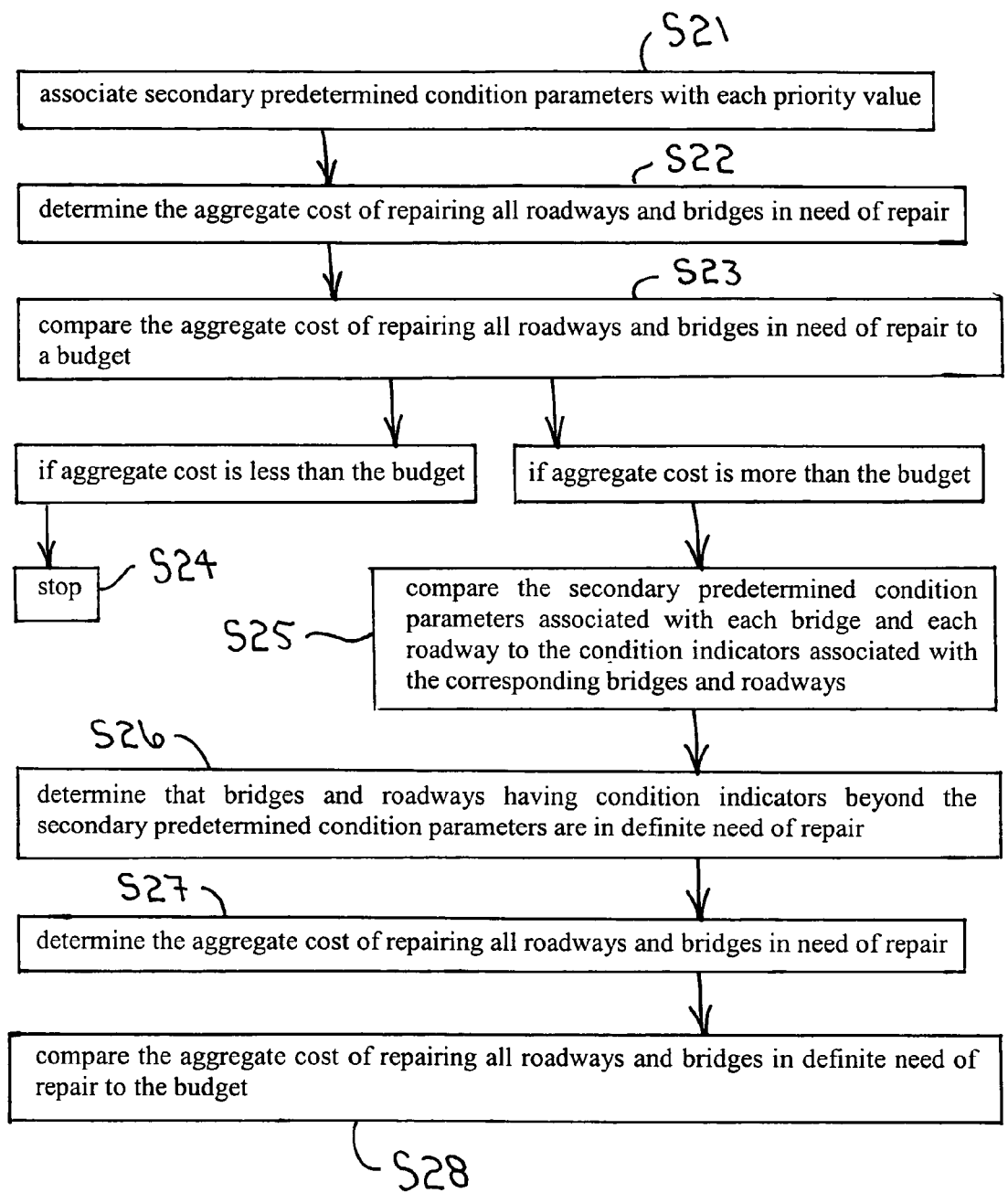
FIG. 12 is a flowchart that shows one exemplary process for determining which roadways and bridges are in definite need of repair and comparing costs to a budget.

If there are budget concerns, a set of secondary predetermined condition parameters 134 may be associated with each priority value 120 as seen in step S21 (FIG. 12). The secondary predetermined condition parameters 132 correspond to the condition indicators 110 and include alternate acceptable levels of severity 134a to compare to the condition indicators 110 (FIG. 11).

At step S22 (FIG. 12), the aggregate cost of repairing all roadways 12 and bridges 14 in need of repair is determined by adding together the individual costs associated with each roadway 12 and each bridge 14. This aggregate cost is then compared to a budget in step S23 (FIG. 12). If the aggregate cost is less than the budget, the user proceeds to step S24 (FIG. 12), where the decision and comparison process ends. If the aggregate cost is more than the budget, the user proceeds to step S25.

At step S25 (FIG. 12), the secondary predetermined condition parameters 134 associated with each respective bridge 14 and roadway 12 are compared to the condition indicators 110 associated with the corresponding bridge 14 or roadway 12. This comparison can be seen in FIG. 11 at 136. Respective bridges 14 and roadways 12 having condition indicators 110 beyond the associated secondary predetermined condition parameters 134 should then be determined to be in definite need of repair at step S26 (FIG. 12). In the example of FIG. 11, the concrete lane/shoulder drop off indicator of "medium" is not beyond the acceptable level of "medium", so the structure corresponding to FIG. 11 should not be determined to be in definite need of repair.

The user should then proceed to step S27 (FIG. 12), where the aggregate cost of repairing all bridges 14 and roadways 12 in definite need of repair is determined by adding together the individual costs associated with each roadway 12 and each bridge 14 in definite need of repair. This aggregate cost is then compared to the budget in step S28 (FIG. 12) by subtracting this aggregate cost from the budget.

Figure 13:
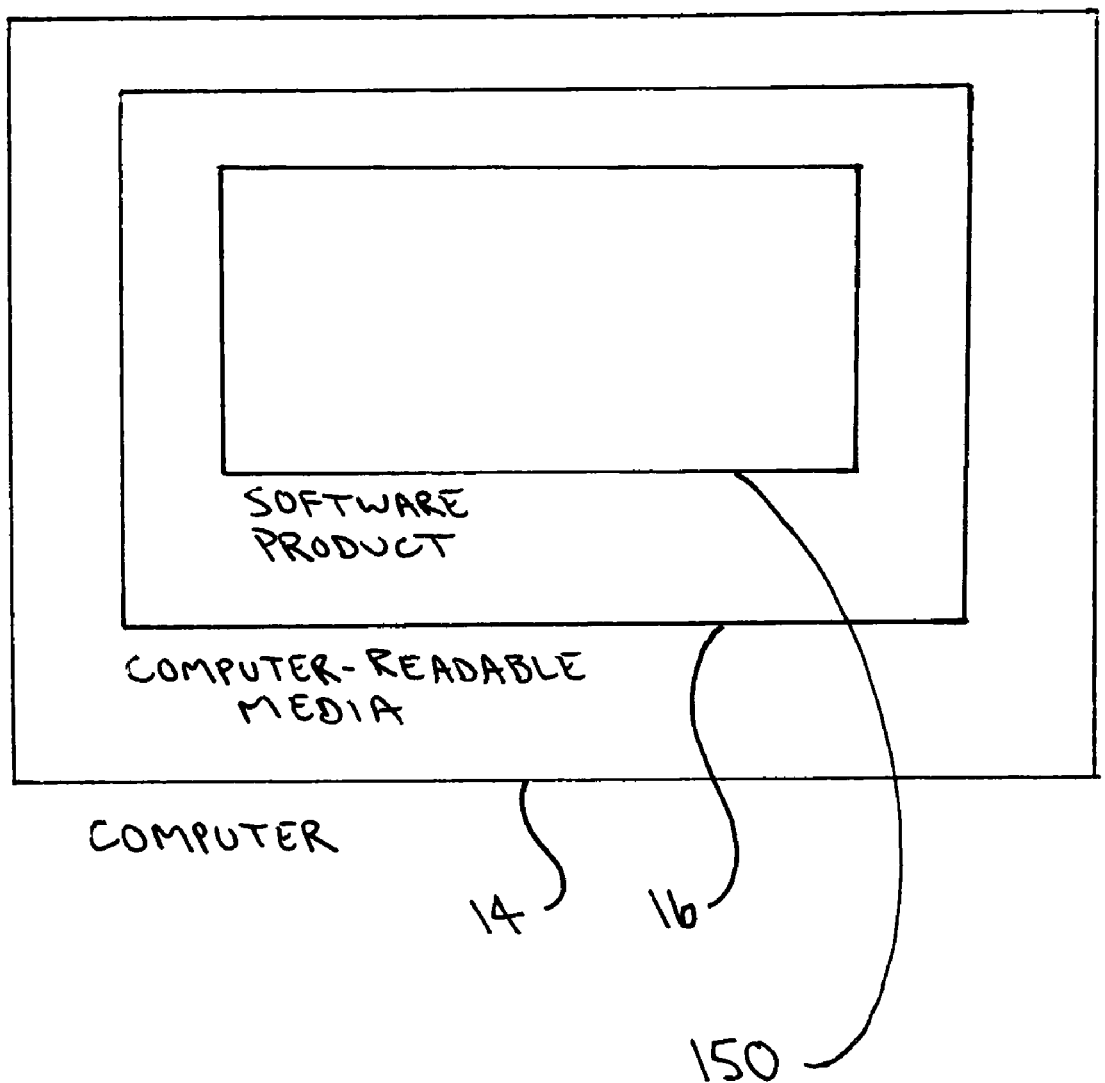
FIG. 13 is a diagram indicating associations between a software product, computer-readable media, and a computer.
Figure 14:
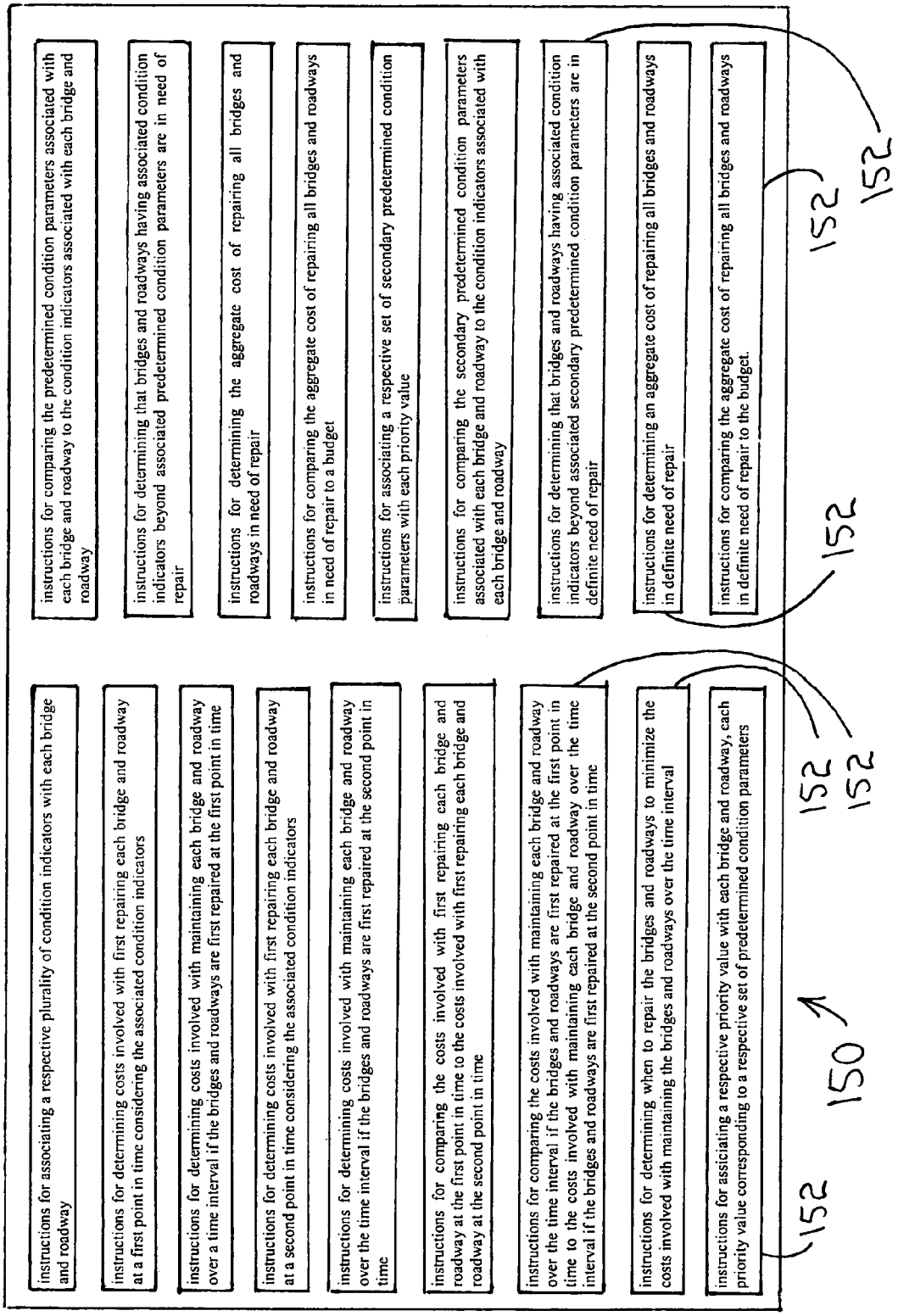
FIG. 14 is a diagram of a preferred embodiment of a software product.

In a preferred embodiment of the current invention, the above-described method of evaluating transportation infrastructure 10 is incorporated into a software product 150 comprising instructions 152. The software product 150 is stored on computer-readable media 16, and when executed by a computer 14, the instructions perform the above-described steps for evaluating transportation infrastructure 10. FIGS. 13 and 14 illustrate the software product 150.

It is understood that while certain forms of this invention have been illustrated and described, it is not limited thereto except insofar as such limitations are included in the following claims and allowable functional equivalents thereof.

What is claimed is as follows:

1. A software product comprising instructions, stored on computer-readable media, wherein the instructions, when executed by a computer, perform steps for evaluating a plurality of roadways, the steps comprising:
(a) associating each respective roadway with at least three condition indicators selected from the group consisting of:
 (i) an asphalt ride quality indicator;
 (ii) an asphalt alligator cracking indicator;
 (iii) an asphalt bleeding indicator;
 (iv) an asphalt block cracking indicator;
 (v) an asphalt bump/sag indicator;
 (vi) an asphalt corrugation indicator;
 (vii) an asphalt depression indicator;
 (viii) an asphalt edge cracking indicator;
 (ix) an asphalt joint reflection cracking indicator;
 (x) an asphalt lane/shoulder drop off indicator;
 (xi) an asphalt longitudinal and transverse cracking indicator;
 (xii) an asphalt patching and utility cut patching indicator;
 (xiii) an asphalt pothole indicator;
 (xiv) an asphalt railroad crossing indicator;
 (xv) an asphalt rutting indicator;
 (xvi) an asphalt shoving indicator;
 (xvii) an asphalt slippage cracking indicator;
 (xviii) an asphalt swell indicator;
 (ix) an asphalt weathering and raveling indicator;
 (xx) a concrete buckling indicator;
 (xxi) a concrete divided slab indicator;
 (xxii) a concrete durability cracking indicator;
 (xxiii) a concrete faulting indicator;
 (xxiv) a concrete joint seal damage indicator;
 (xxv) a concrete lane/shoulder drop off indicator;
 (xxvi) a concrete linear cracking indicator;
 (xxvii) a concrete large patching indicator;
 (xxviii) a concrete small patching indicator;
 (xxix) a concrete punchout indicator;

(xxx) a concrete railroad crossing indicator;
(xxxi) a concrete scaling/crazing indicator;
(xxxii) a concrete corner spalling indicator; and
(xxxiii) a concrete joint spalling indicator;

(b) determining costs involved with first repairing each roadway at a first point in time considering the associated condition indicators;

(c) determining costs involved with maintaining each roadway over a time interval considering the associated condition indicators where each roadway is first repaired at the first point in time;

(d) determining costs involved with first repairing each roadway at a second point in time considering the associated condition indicators, the first and second points in time being different points in time;

(e) determining costs involved with maintaining each roadway over the time interval considering the associated condition indicators where each roadway is first repaired at the second point in time;

(f) comparing the costs determined in step (b) with the costs determined in step (d);

(g) comparing the costs determined in step (c) with the costs determined in step (e);

(h) associating each respective roadway with one of a plurality of priority values, at least two said roadways having different said priority values, each respective priority value having its own unique set of primary acceptable levels of severity for each condition indicator;

(i) for each roadway, comparing its primary acceptable levels of severity for each condition indicator with its corresponding condition indicators; and (j) determining that respective roadways having associated condition indicators beyond corresponding primary acceptable levels of severity are in need of repair.

2. The software product of claim 1, wherein each respective priority value has its own set of secondary acceptable levels of severity for each condition indicator, the steps further comprising:

for each roadway, comparing its secondary acceptable levels of severity for each condition indicator with its corresponding condition indicators; and determining that respective roadways having associated condition indicators beyond corresponding secondary acceptable levels of severity are in definite need of repair.

3. The software product of claim 2, wherein each respective priority value has a combination of said primary and secondary acceptable levels of severity that is unique from all other said priority values.

4. The software product of claim 3, wherein the steps further comprise:

determining an aggregate cost for repairing all roadways determined to be in need of repair; and determining an aggregate cost for repairing all roadways determined to be in definite need of repair.

5. The software product of claim 1, wherein each respective priority value has its own set of secondary acceptable levels of severity for each condition indicator, the steps further comprising:

for each roadway, comparing its secondary acceptable levels of severity for each condition indicator with its corresponding condition indicators; and determining that respective roadways having associated condition indicators beyond corresponding secondary acceptable levels of severity are in definite need of repair.

6. The software product of claim 5, wherein the steps further comprise:

determining an aggregate cost for repairing all roadways determined to be in need of repair; and determining an aggregate cost for repairing all roadways determined to be in definite need of repair.

7. A software product comprising instructions, stored on computer-readable media, wherein the instructions, when executed by a computer, perform steps for evaluating a plurality of roadways, the steps comprising:

(a) associating each respective roadway with at least three condition indicators selected from the group consisting of:
(i) an asphalt ride quality indicator;
(ii) an asphalt alligator cracking indicator;
(iii) an asphalt bleeding indicator;
(iv) an asphalt block cracking indicator;
(v) an asphalt bump/sag indicator;
(vi) an asphalt corrugation indicator;
(vii) an asphalt depression indicator;
(viii) an asphalt edge cracking indicator;
(ix) an asphalt joint reflection cracking indicator;
(x) an asphalt lane/shoulder drop off indicator;
(xi) an asphalt longitudinal and transverse cracking indicator;
(xii) an asphalt patching and utility cut patching indicator;
(xiii) an asphalt pothole indicator;
(xiv) an asphalt railroad crossing indicator;
(xv) an asphalt rutting indicator;
(xvi) an asphalt shoving indicator;
(xvii) an asphalt slippage cracking indicator;
(xviii) an asphalt swell indicator;
(ix) an asphalt weathering and raveling indicator;
(xx) a concrete buckling indicator;
(xxi) a concrete divided slab indicator;
(xxii) a concrete durability cracking indicator;
(xxiii) a concrete faulting indicator;
(xxiv) a concrete joint seal damage indicator;
(xxv) a concrete lane/shoulder drop off indicator;
(xxvi) a concrete linear cracking indicator;
(xxvii) a concrete large patching indicator;
(xxviii) a concrete small patching indicator;
(xxix) a concrete punchout indicator;
(xxx) a concrete railroad crossing indicator;
(xxxi) a concrete scaling/crazing indicator;
(xxxii) a concrete corner spalling indicator; and
(xxxiii) a concrete joint spalling indicator;

(b) associating each respective roadway with one of a plurality of priority values, at least two said roadways having different said priority values, each respective priority value having its own set of primary acceptable levels of severity for each condition indicator, each respective priority value having its own set of secondary acceptable levels of severity for each condition indicator;

(c) for each roadway, comparing its primary acceptable levels of severity for each condition indicator with its corresponding condition indicators;

(d) determining that respective roadways having associated condition indicators beyond corresponding primary acceptable levels of severity are in need of repair;

(e) for each roadway, comparing its secondary acceptable levels of severity for each condition indicator with its corresponding condition indicators; and (f) determining that respective roadways having associated condition indicators beyond corresponding secondary acceptable levels of severity are in definite need of repair.

8. The software product of claim 7, wherein each respective priority value has a combination of said primary and secondary acceptable levels of severity that is unique from all other said priority values.

9. The software product of claim 7, wherein the steps further comprise:
   determining an aggregate cost for repairing all roadways determined to be in need of repair; and
   determining an aggregate cost for repairing all roadways determined to be in definite need of repair.

10. A software product comprising instructions, stored on computer-readable media, wherein the instructions, when executed by a computer, perform steps for evaluating a plurality of roadways, the steps comprising:
   (a) associating each respective roadway with at least four condition indicators selected from the group consisting of:
      (i) an asphalt ride quality indicator;
      (ii) an asphalt alligator cracking indicator;
      (iii) an asphalt bleeding indicator;
      (iv) an asphalt block cracking indicator;
      (v) an asphalt bump/sag indicator;
      (vi) an asphalt corrugation indicator;
      (vii) an asphalt depression indicator;
      (viii) an asphalt edge cracking indicator;
      (ix) an asphalt joint reflection cracking indicator;
      (x) an asphalt lane/shoulder drop off indicator;
      (xi) an asphalt longitudinal and transverse cracking indicator;
      (xii) an asphalt patching and utility cut patching indicator;
      (xiii) an asphalt pothole indicator;
      (xiv) an asphalt railroad crossing indicator;
      (xv) an asphalt rutting indicator;
      (xvi) an asphalt shoving indicator;
      (xvii) an asphalt slippage cracking indicator;
      (xviii) an asphalt swell indicator;
      (ix) an asphalt weathering and raveling indicator;
      (xx) a concrete buckling indicator;
      (xxi) a concrete divided slab indicator;
      (xxii) a concrete durability cracking indicator;
      (xxiii) a concrete faulting indicator;
      (xxiv) a concrete joint seal damage indicator;
      (xxv) a concrete lane/shoulder drop off indicator;
      (xxvi) a concrete linear cracking indicator;
      (xxvii) a concrete large patching indicator;
      (xxviii) a concrete small patching indicator;
      (xxix) a concrete punchout indicator;
      (xxx) a concrete railroad crossing indicator;
      (xxxi) a concrete scaling/crazing indicator;
      (xxxii) a concrete corner spalling indicator; and
      (xxxiii) a concrete joint spalling indicator;
   (b) determining costs involved with first repairing each roadway at a first point in time considering the associated condition indicators;
   (c) determining costs involved with maintaining each roadway over a time interval considering the associated condition indicators where each roadway is first repaired at the first point in time;
   (d) determining costs involved with first repairing each roadway at a second point in time considering the associated condition indicators, the first and second points in time being different points in time;
   (e) determining costs involved with maintaining each roadway over the time interval considering the associated condition indicators where each roadway is first repaired at the second point in time;
   (f) comparing the costs determined in step (b) with the costs determined in step (d);
   (g) comparing the costs determined in step (c) with the costs determined in step (e);
   (h) associating each respective roadway with one of a plurality of priority values, at least two said roadways having different said priority values, each respective priority value having its own set of primary acceptable levels of severity for each condition indicator;
   (i) for each roadway, comparing its primary acceptable levels of severity for each condition indicator with its corresponding condition indicators; and
   (j) determining that respective roadways having associated condition indicators beyond corresponding primary acceptable levels of severity are in need of repair.

* * * * *